March 17, 1936.　　　　J. W. WABER　　　　2,033,962
PUNCTUREPROOF TUBE AND METHOD OF MAKING SAME
Filed June 16, 1934
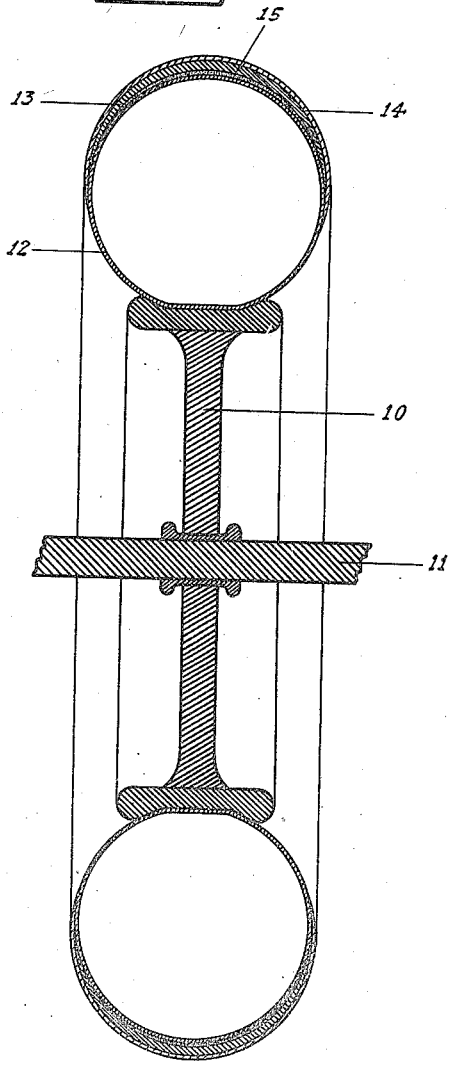
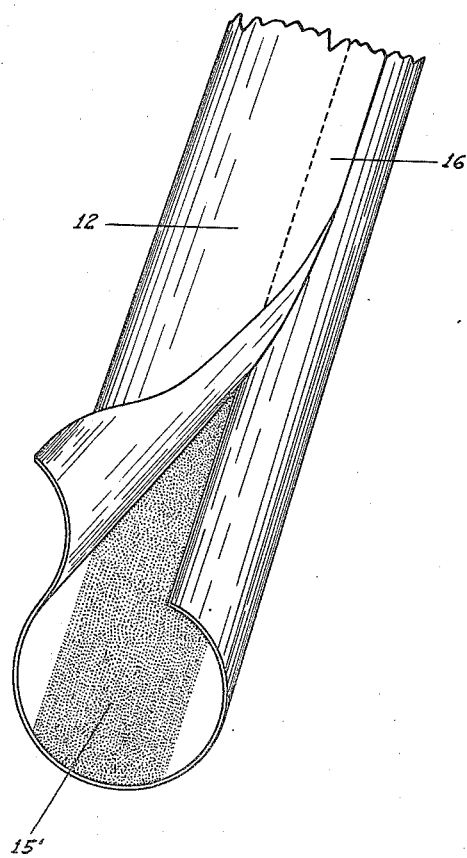
Inventor:
James W. Waber,
By C. P. Soper
Attorney.

Patented Mar. 17, 1936

2,033,962

UNITED STATES PATENT OFFICE 2,033,962

PUNCTUREPROOF TUBE AND METHOD OF MAKING SAME

James W. Waber, Chicago, Ill.

Application June 16, 1934, Serial No. 730,878

5 Claims. (Cl. 154—15)

This invention relates to a new and useful improvement in the method or process of making puncture proof tubes, such as are used in the ordinary casings or tires of automobiles and is particularly intended as an improvement on the process disclosed in applicant's Patent No. 1,808,091 granted June 2, 1931.

It may be noted that the finished product or tube of the present invention may be substantially identical with that disclosed in said patent.

In a puncture proof inner tube consisting at the tread portion of two layers of vulcanizable rubber between which is a layer of mastic or unvulcanizable rubber, the inner vulcanizable layer at the tread portion is removed from the vulcanizing mold by a distance of at least two or three times its thickness. As a result, in vulcanizing or curing the tube by the process disclosed in applicant's patent it is necessary that the vulcanizing process be continued for a substantial length of time in order to cure the inner vulcanizable layer at the tread portion of the tube.

The object of the present invention is a process by which the inner vulcanizable layer at the tread portion of the tube will become cured or vulcanized in substantially the length of time required to vulcanize the portions of the tube which are in direct contact with the mold. This not only has the effect of very substantially shortening the period of vulcanization but also results in a much more uniform product.

A feature of the invention is the treatment of the inner vulcanizable layer of the tube at the tread portion thereof under the mastic with a suitable vulcanization accelerator, such as "Zimate" or other similar compounds capable of accelerating or producing vulcanization of rubber at low temperatures. This accelerator is applied directly to the tread portion of the inner vulcanizable layer under the mastic and may be on the side immediately adjacent to the mastic or it will have the same result if applied on the inner surface of the said inner vulcanizable layer.

It is believed a further disclosure of the invention will be best understood from a detailed description thereof taken in connection with the accompanying drawing in which Fig. 1 illustrates a cross-section thru the revolving form or working wheel with the tube of the present invention mounted thereon prior to its being vulcanized; and Fig. 2 shows a portion of the inner vulcanizable tube formed of a strip of rubber and the vulcanization accelerator applied to the inner surface thereof.

Referring now to the drawing, 10 indicates the revolving form or wheel upon which the tube in process of construction may be mounted and 11 the axle or support about which the wheel 10 may rotate. 12 indicates the inner vulcanizable layer of the tube which may be formed of extruded tubular rubber with the ends joined together so as to produce an endless tube. This inner layer of the tube need not differ greatly from the ordinary automobile tire tube. It may be here noted that the process preferably followed in the present invention need not differ materially from that disclosed in the above noted patent, except as to the use of the vulcanization accelerator. In the manufacture of the tubes of the present invention Zimate has been found very satisfactory as an accelerator, although other ultra-accelerators with the same general characteristics may be used with vulcanizing agents and produce satisfactory results. The accelerator which is known under the trade-name of Zimate consists essentially of zinc dimethyl-dithiocarbonate and it is believed the formula is as follows $(CH_3)_2 N.C.(S) S Z n S.C.(S) N(CH_3)_2$.

In carrying out this process the inner endless tube is preferably placed on a revolving form or wheel such as the work wheel 10 and is inflated in any desired manner until it is of about the general size that it will have when the tube is completed. This inflation may be accomplished thru the medium of a valve stem which has previously been inserted in the tube layer or may be produced thru the medium of a hollow needle inserted thru the tube wall. After the tube has been placed upon the wheel and inflated a substantially crescent shaped strip of mastic 13 is placed about the tread portion thereof, and overlying the mastic is placed a second vulcanizable strip 14 the edges of which extend beyond the edges of the mastic and into contact with the inner layer 12. In order to practice the present invention the tread portion of the inner vulcanizable layer 12 prior to the application of the mastic thereto is treated with a vulcanization accelerator 15 as indicated by the dotted portion in Fig. 2.

After the tube has been built upon the wheel as just described above, it is placed in a mold, the inner surface of which is preferably of substantially the size and shape of the cavity in the tire with which the tube is intended to be used, and vulcanized in the usual manner.

Due to the use of the accelerator 15 it is found that the inner vulcanizable layer 12 under the mastic will be satisfactorily cured in nearly the length of time which is required to vulcanize the portions of the tube which come directly in contact with the mold. This greatly shortens the time of the vulcanizing process and also gives somewhat more reliable results.

In Fig. 2 is shown a method of forming the inner vulcanizable layer 12' of the tube from a strip of rubber instead of from the extruded tube such as described in connection with Fig. 1. In Fig. 2 the edges of the strip are overlapped as shown at 16 and the vulcanization accelerator 15' may be applied to the inner surface of the tread portion of the tube instead of to the outer surface as shown in Fig. 1. With the exception of the manner of forming the inner vulcanizable layer of the tube the process of forming the complete tube according to the structure shown in Fig. 2 may be carried out in substantially the same manner as described in connection with Fig. 1.

While in the above disclosure the tube has been described as built up on a revolving form or wheel it is to be understood that the present process may be carried out without resorting to this expedient altho this has been found to be the most satisfactory manner of forming the tube. The only requirement of the present process is that the accelerator shall be applied to the inner vulcanizable layer of the tube under the mastic, either inside or outside; that the layer of mastic be applied to the tread portion thereof and the mastic covered by an outer vulcanizable layer of rubber the edges of which contact with the inner vulcanizable layer and that the whole structure then be vulcanized. It is to be understood of course that the accelerator may be applied to the tread portion of the inner vulcanizable layer in any manner or at any stage in the process so long as it is substantially confined to the portion of the inner layer which underlies the mastic.

Having thus described my invention, what I claim as new and desire to secure by United States Letters Patent is:

1. An inner tube for pneumatic tires comprising a basic inner layer, annular and tubular, of rubber or like vulcanizable material, an outer cover layer of like material, both layers being fully and substantially uniformly vulcanized or "tight cured" about a layer of plastic sealing compound interposed between said basic layer and said cover layer, over the tread area, both layers of said tube being full molded throughout the area registering inside and out with the sealing compound in substantially the form and shape assumed under normal inflation, the contour of the outer layer being determined directly by the mold and that of the inner layer being indirectly determined thereby as the sealing compound accommodates itself thereto and the inner layer adapts itself and the inner surface of the composition layer to the combined effect of the shape of the mold and an internal normal inflation pressure; such contours being definitely set by the full vulcanization or "tight curing" of the inner and outer layers and therefore substantially free from strain or distortion under normal inflation, the said basic layer and cover layer being homogeneous throughout their contacting portions when vulcanized, the portion of the basic inner layer underlying the sealing compound having a tight cure.

2. The method of constructing an inner tube for pneumatic tires comprising a plurality of tread layers which consists in applying to the tread portion of a vulcanizable tube a layer of plastic unvulcanizable sealing compound, covering said compound with a layer of vulcanizable material which extends beyond the edges of said compound and contacts with the tube for vulcanization thereto and curing all the vulcanizable material substantially as a whole uniformly in a mold, characterized by applying a vulcanization accelerator to the tread part of the inner layer; which being spaced from the vulcanization mold by the plastic unvulcanizable sealing compound would otherwise prevent or at least delay the vulcanization of part of the inner layer; so as to cause a substantially uniform tight cure of both inner and outer layers without overcuring of any part.

3. The method of constructing an inner tube for pneumatic tires comprising a plurality of tread layers which consists in applying to the tread portion of a vulcanizable tube a layer of plastic unvulcanizable sealing compound, covering said compound with a layer of vulcanizable material which extends beyond the edges of said compound and contacts with the tube for vulcanization thereto and curing all the vulcanizable material substantially as a whole in a mold, characterized by applying prior to the unvulcanizable plastic layer, a vulcanization accelerator to the tread part of the inner layer, which, being spaced from the vulcanizing mold by the plastic unvulcanizable material, would otherwise be prevented from, or at least delayed in being vulcanized, so as to cause the simultaneous substantially uniform tight curing of both inner and outer layers without overcuring of any part.

4. The method of constructing an inner tube for pneumatic tires comprising a plurality of layers which consists in forming an endless tube of vulcanizable material, expanding it by internal pressure, applying to the tread portion of the tube so inflated a layer of plastic unvulcanizable sealing compound and a layer of vulcanizable material which extends beyond the edges of the compound and contacts with the tube for vulcanization thereto and curing all the vulcanizable material substantially as a whole uniformly, characterized by applying a vulcanization accelerator to the tread part of the inner layer, the spacing of which from the vulcanizing mold by the plastic unvulcanizable compound would otherwise prevent or at least delay the vulcanization of this part of the inner layer, so as to cause a substantially uniform tight cure of both inner and outer layers without overcuring of any part.

5. The method of constructing an inner tube for pneumatic tires comprising a plurality of tread layers which consists in forming an endless tube of vulcanizable material, expanding it by internal pressure, applying to the tread portion of the tube so inflated a layer of plastic unvulcanizable sealing compound and a layer of vulcanizable material which extends beyond the edges of the compound and contacts with the tube for vulcanization thereto and curing all the vulcanizable material simultaneously substantially uniformly as a whole, characterized by applying, prior to the unvulcanizable plastic compound, a vulcanization accelerator to the tread part of the inner layer the spacing of which from the vulcanizing mold by the plastic unvulcanizable sealing compound would otherwise prevent or at least delay the vulcanization of this part of the inner layer so as to cause a substantially uniform tight cure of both inner and outer layers without overcuring of any part.

JAMES W. WABER.